(12) United States Patent
Wilson

(10) Patent No.: US 9,100,485 B2
(45) Date of Patent: Aug. 4, 2015

(54) ADAPTIVE STOCHASTIC QUEUEING

(71) Applicant: Kitchener Clark Wilson, Santa Barbara, CA (US)

(72) Inventor: Kitchener Clark Wilson, Santa Barbara, CA (US)

( * ) Notice: Subject to any disclaimer, the term of this patent is extended or adjusted under 35 U.S.C. 154(b) by 0 days.

(21) Appl. No.: 14/028,378

(22) Filed: Sep. 16, 2013

(65) Prior Publication Data

US 2015/0078548 A1 Mar. 19, 2015

(51) Int. Cl.
*H04M 3/523* (2006.01)
(52) U.S. Cl.
CPC ..................... *H04M 3/523* (2013.01)
(58) Field of Classification Search
CPC .. H04M 3/523; H04M 2203/551; H04Q 3/64; G06Q 10/06
USPC ...................... 379/266.01; 718/104
See application file for complete search history.

(56) References Cited

U.S. PATENT DOCUMENTS

| 2012/0087486 A1* | 4/2012 | Guerrero et al. | 379/265.02 |
| 2013/0074089 A1* | 3/2013 | Madaiah | 718/103 |
| 2014/0023186 A1* | 1/2014 | Srinivas et al. | 379/266.01 |

OTHER PUBLICATIONS

Wicklin, The inverse CDF method for simulating from a distribution, Jul. 22, 2013.*

* cited by examiner

*Primary Examiner* — Ahmad F Matar
*Assistant Examiner* — Jirapon Intavong

(57) ABSTRACT

An Adaptive Stochastic Queueing device comprises a process that maintains a plurality of queues defined around the known and changing resource usage history of an ensemble of customers, customers seeking access to a resource. Applying a stochastic approach that reflects the history of each customer in reference to the ensemble history, the queues intercept and sort customers. A stochastic sequencer sequences customers from the queues to the resource in a manner that selectively promotes customers in a manner attuned to the application using the device.

15 Claims, 7 Drawing Sheets

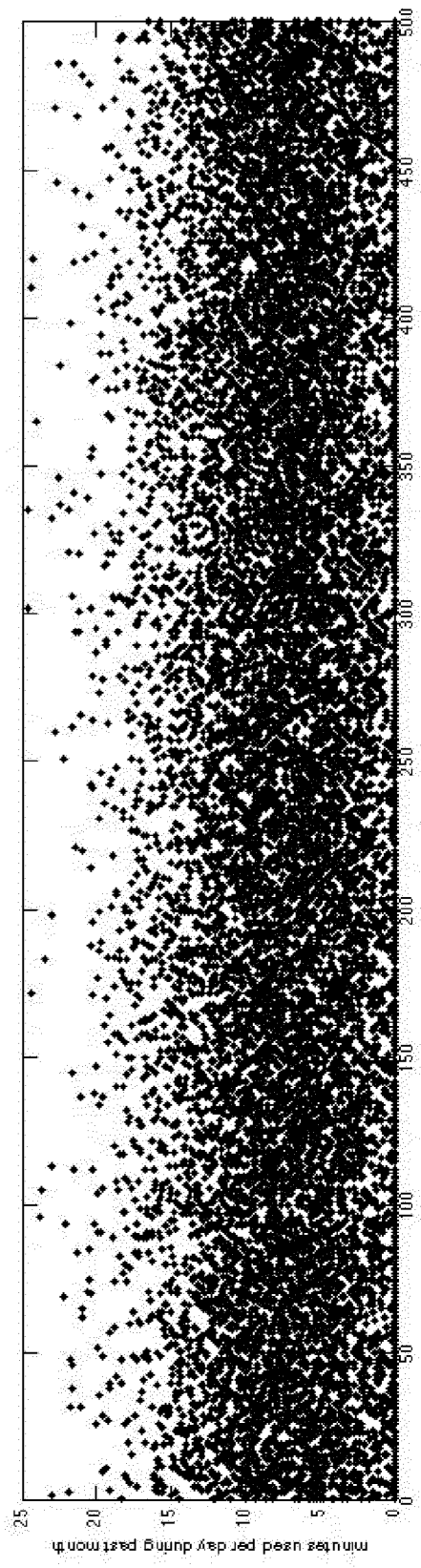
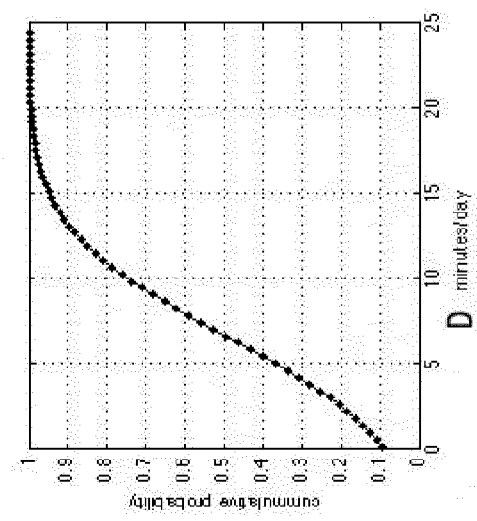
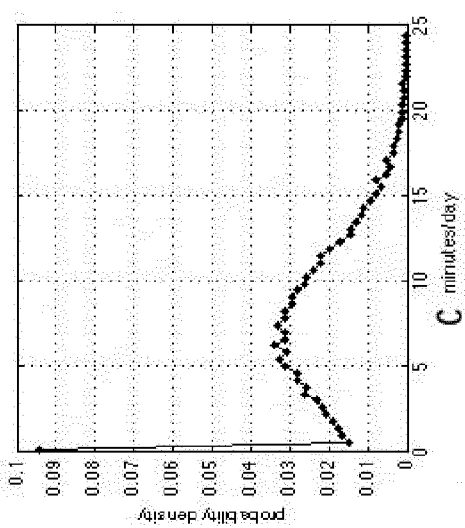
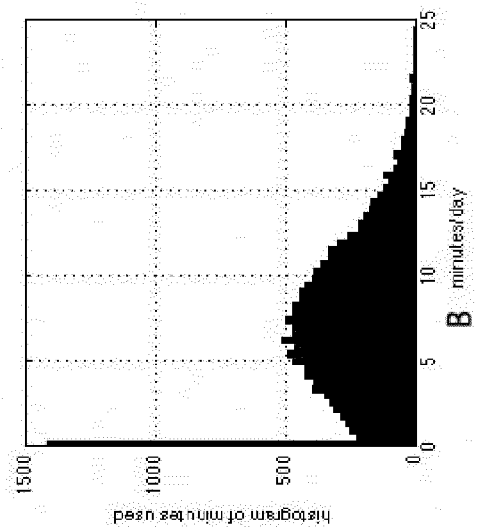
FIG. 4

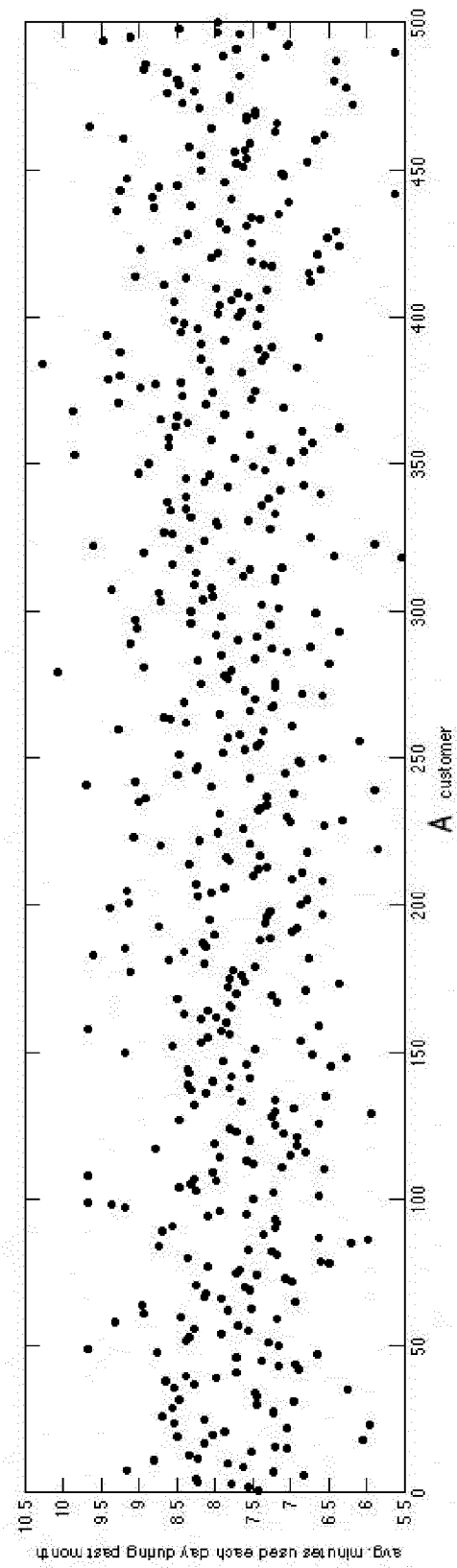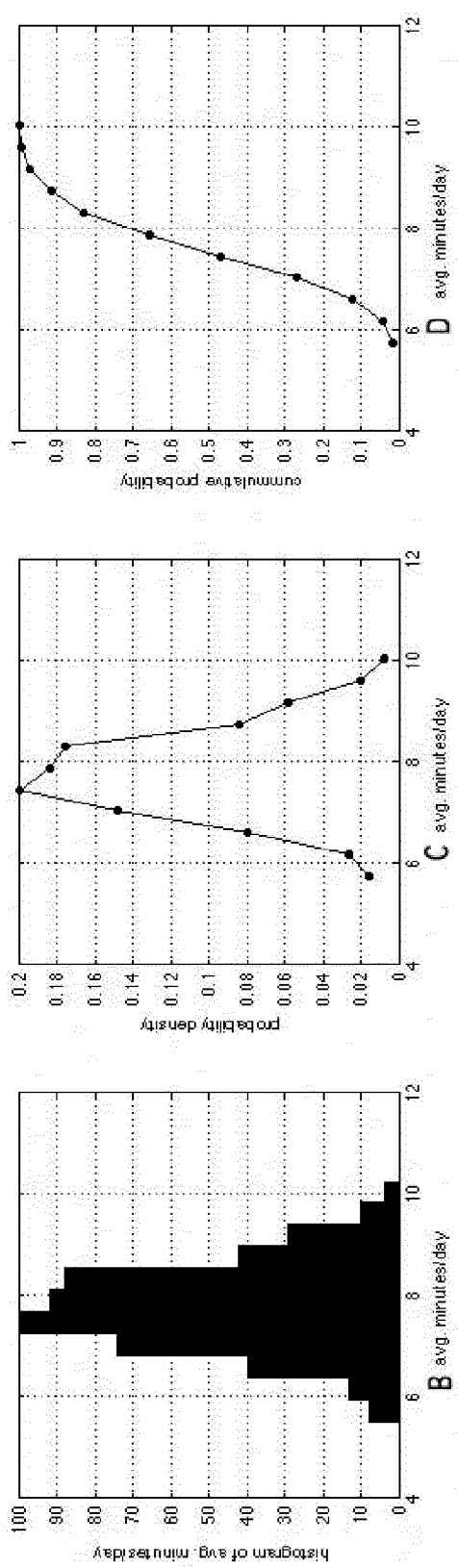
FIG 5

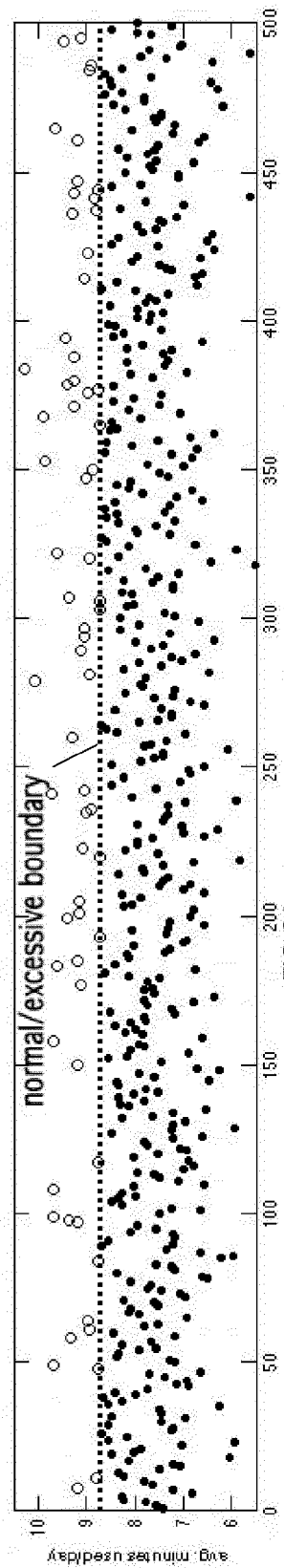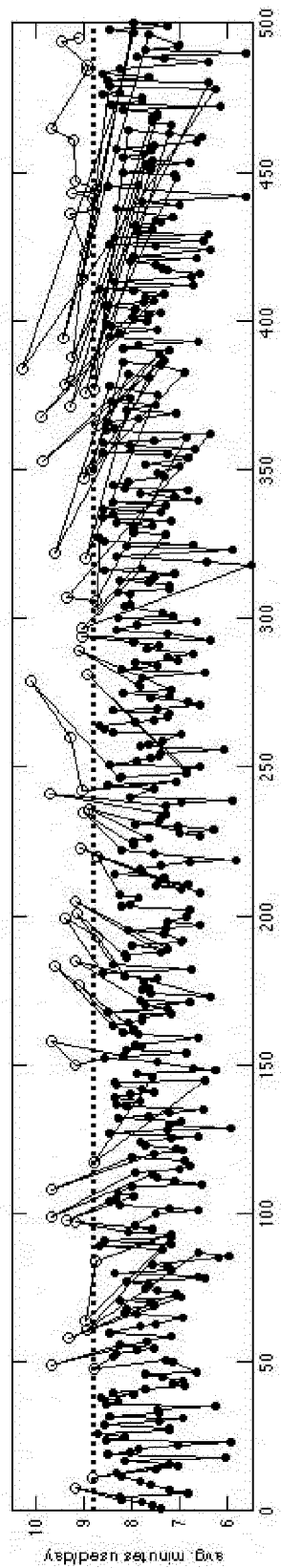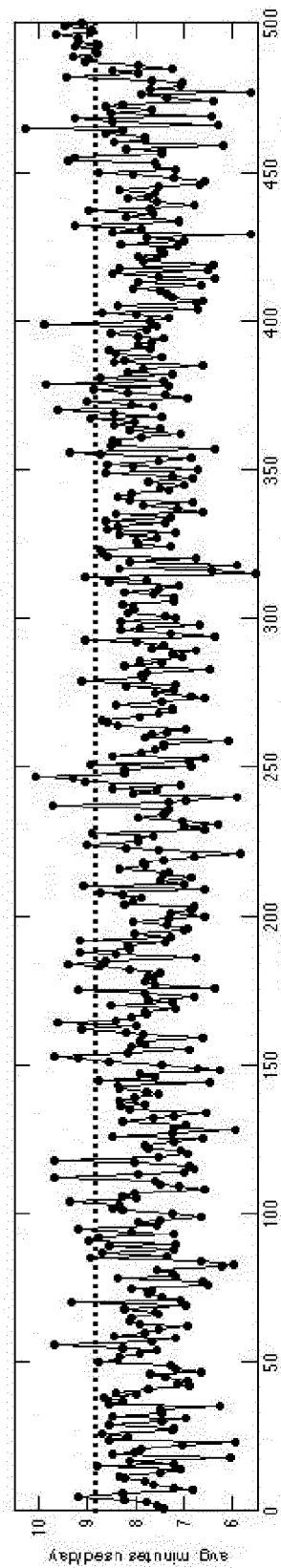

ADAPTIVE STOCHASTIC QUEUEING

RELATED APPLICATIONS

This application claims the benefit of U.S. Provisional Application Ser. No. 61/702,457 filed Sep. 18, 2012.

BACKGROUND AND STATE OF THE ART

1. Field of the Invention:

The present invention relates generally to the placement of customers into queues providing access to resources. More particularly, the present invention relates to adapting queues to sequence customers according to their resource usage.

2. General Background and State of the Art:

The standard queueing algorithm for customer placement is the First In First Out (FIFO) where the most recent arriving customer is place at the end of the queue and the first customer in the queue is given access to the resource when the resource becomes available. This is typical of call centers responding to customers calling in for information or ordering.

In the call center case the customers are generally unknown and there is no a priori means to select their queue placement or sequencing. However, there are many applications that draw from a defined customer pool, as when a customer must log-in to a site for which each customer has provided identifying means (e.g. log-in ID and password). Log-in can also be performed based on the calling telephone number provided by caller ID, over the interne by TCP/IP protocol with its IP addresses and MAC addresses and such, or as programmed into a customer communication protocol.

As an example, consider an at-home resident support system aimed to facilitate the home stay of customers, rather than having them enter expensive assisted living facilities, by providing them with support including:

live attendant contact
shopping and delivery support
home and garden maintenance support
psychological and medical aid
transportation
exercise
education
financial and bill paying
legal and accounting services
social connection
entertainment
loved one interaction

. . .

Such a system, built around modern audio/visual communication devices (e.g. tablet computer, smart phone, laptop, . . . ) provides audio/visual interaction with automated as well as live operator assisted support. This is a contractual relationship and the system provider has a requirement to respond to the customer. This can be challenging given the need to be cost effective and maintain low customer fees, while some customers are chronically needy and consume significant resources beyond that of the normal customer population. In some cases the customer is delinquent in his/her payment for services, yet is dependent on the services and must be supported while the delinquency is managed.

Temporary high resource consumption is not problematic when the resources are underutilized, as perhaps in the middle of the night when most customers are sleeping, but at other times the increase due to a chronically overusing customer may make it difficult to adequately support other customers without adding resources and personnel. Using a shared database, like the cloud, consumption increases are allocated to underutilized remote support sites that, having all the information needed from the cloud database, can respond to a customer regardless where he is. Such situations commonly occur during natural events such as earthquakes or storms. This re-distributing of resources is not free and must be included in the resource accessibility cost.

One obvious way to work with a chronically overusing customer is to see if an accommodation can be reached with him. Lacking that, chronic overusing customers can be handled by increasing their fee to pay for the additional cost incurred by their greater need.

When the fee increase is outside the customer's budget or willingness to pay, the provider must either absorb the increase, cancel the customer's contract, or do something else. The first choice is not helpful as the increase will ultimately be unfairly distributed to the other customers, and the second choice is a simple last resort that does not solve the problem of chronic overusing customers. Here we focus on the third choice: this invention using Adaptive Stochastic Queueing.

If the application is not fee based, there is always a need to minimize resources and thus minimize cost of doing business to maximize profit.

SUMMARY OF THE INVENTION

FIFO In-the-order-received queuing is not required so long as the customer access to the resource is made in reasonable time and in a fair manner. By fair is meant: to respond to all customers in a timely manner that does not penalize those that do not chronically overuse the resource, yet provides reasonably for those that do. Adaptive Stochastic Queueing comprises adaptive customer sequencing that intercepts customers prior to connecting with a live operator or some other limited resource.

Using Adaptive Stochastic Queueing, as described herein, the sequencing of the customer is dependent on his resource usage history and on the usage history of the ensemble of all customers. As customer resource access requests arrive, telephonic or Ethernet or otherwise, the customer is identified by the communication link (telephone number, internet ID, . . . ), and his usage history drawn from a database. The database usage history comprises, for example, the amount of the resource the ensemble, of which the customer is a member, has used (e.g. daily access time over the last month).

Adaptive Stochastic Queueing includes an algorithm, responsive to this usage history, to position customers within the queue, and a stochastic selection algorithm to sequence customers from the queue.

Adaptive Stochastic Queueing allows the application in which it resides to advantageously shape customer queuing and sequencing to promote some customers while handicapping others.

Further objects and advantages of the present invention will become more apparent from the following description of the preferred embodiments which, taken in conjunction with the accompanying drawings, illustrate, by way of example, the principles of the invention.

DESCRIPTION OF THE DRAWINGS

FIG. 4 is a demonstration of a simulation showing (A) ensemble customer daily usage of a resource, (B) a histogram of the average daily usage by all customers, (C) the probability density calculated from the histogram, and (D) the cumulative probability calculated from the probability density.

FIG. 5 continues the simulation illustrating (A) the ensemble mean daily use of the resource by each of the 500 customers, (B) the histogram of the ensemble data in A, (C) the probability density calculated from the histogram, and (D) the cumulative distribution calculated from the probability density.

FIG. 6 continues the simulation illustrating (A) the binning of the arriving customers into Normal and Excessive queues, (B) the order by which a single FIFO queue would have selected customers for resource access, and (C) the order Adaptive Stochastic Queueing would have selected customers.

DESCRIPTION OF THE PREFERRED EMBODIMENT

Figure 1:
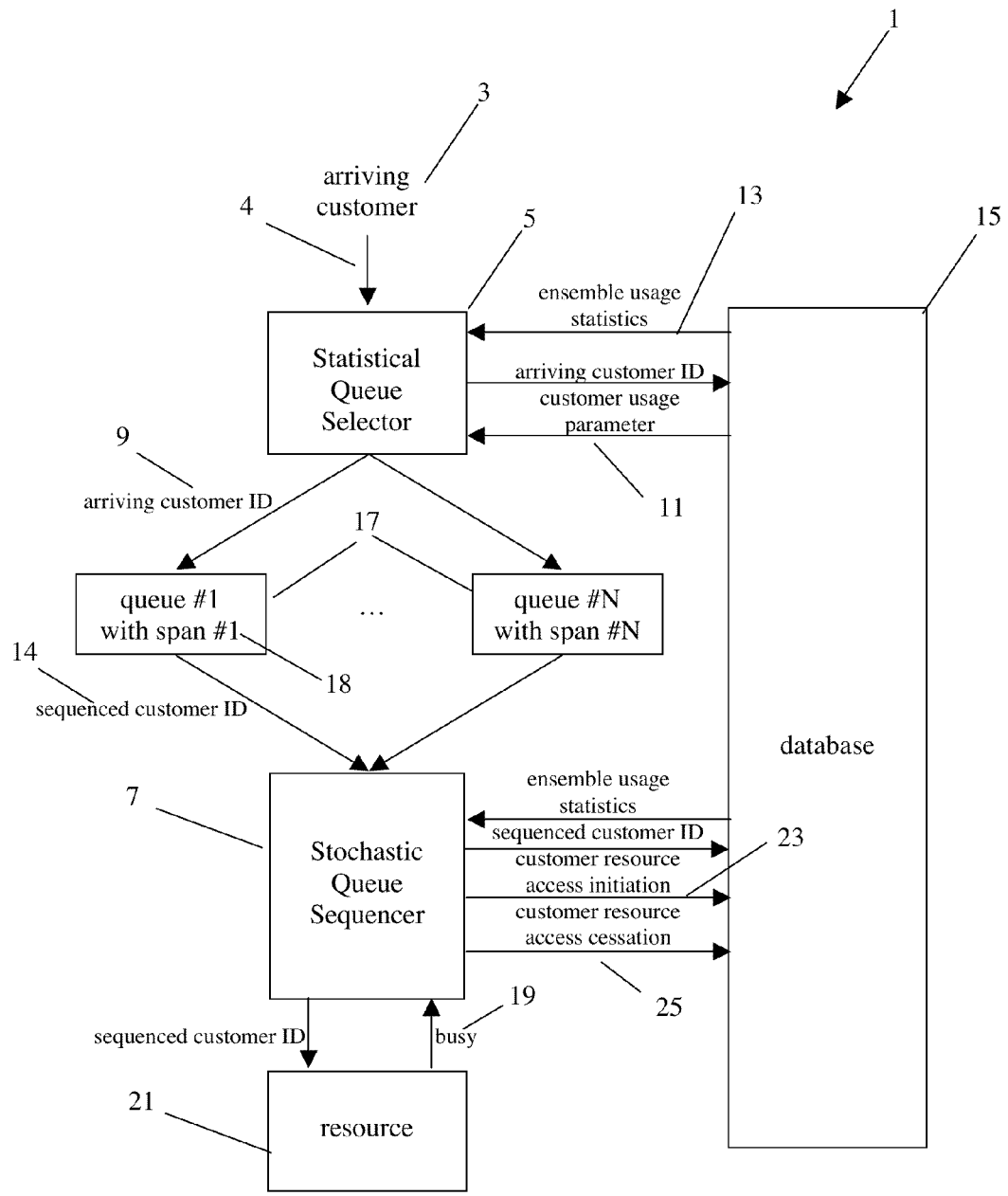
FIG. 1 is a block diagram of the Adaptive Stochastic Queueing.
Figure 2:
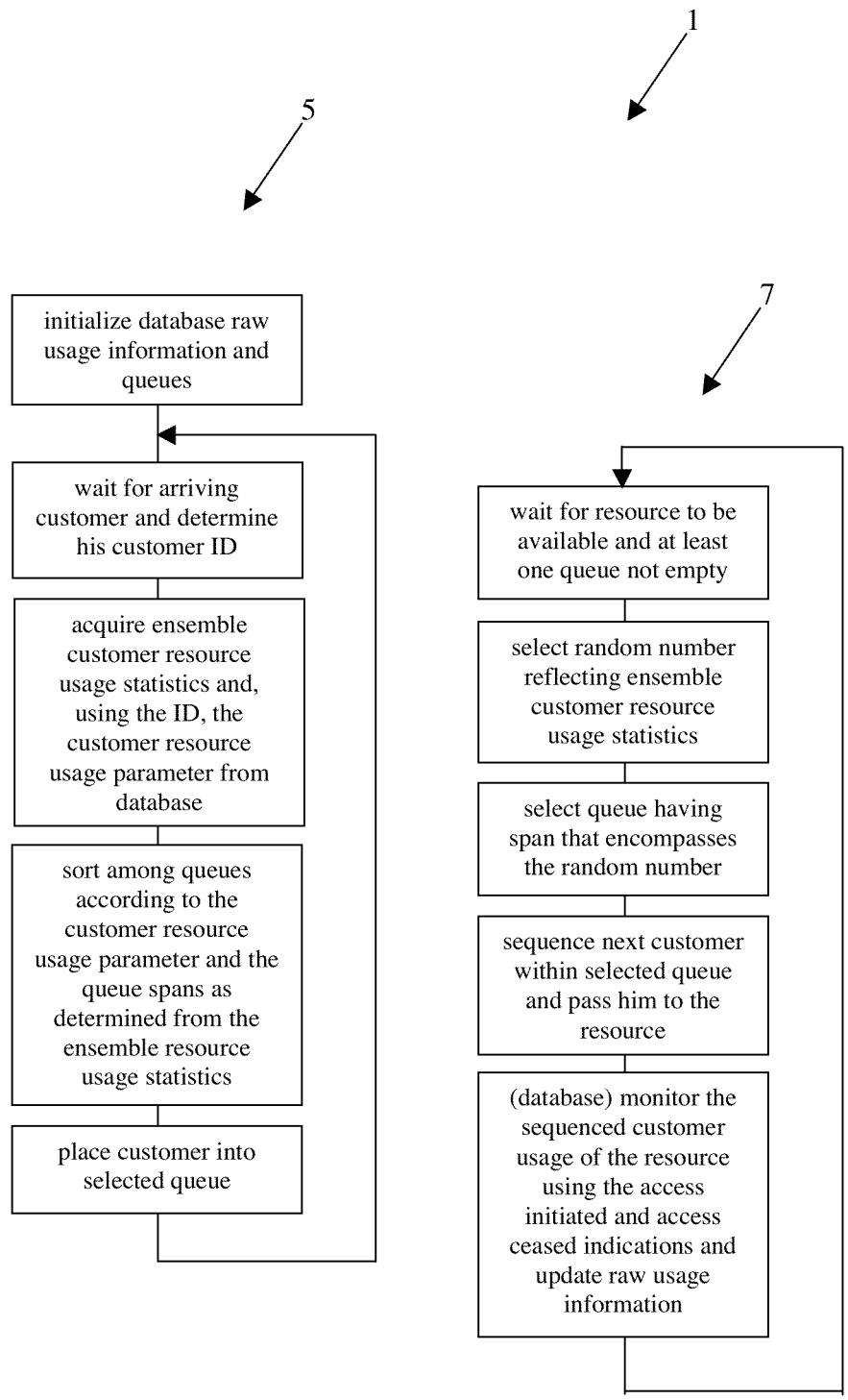
FIG. 2 is a flow chart of the logic of Adaptive Stochastic Queueing.

The preferred embodiment of Adaptive Stochastic Queueing 1 is illustrated in FIG. 1 and FIG. 2. Customers 3, requesting access to resource 21, arrive and the Statistical Queue Selector 5 sorts them into one of a plurality of queues 17 while a Stochastic Queue Sequencer 7 sequences customers from the queues and passes them to the resource for access. A database 15 supports these functions.

Initializer: The database 15 raw usage information 62 is initialized using a priori estimates or historical information, and a plurality of queues 17 are initialized.

Examples of the raw usage information 62 and the queues are included below.

Statistical Queue Selector: The Statistical Queue Selector 5, as arriving customer 3 requests resource 21 access, identifies the arriving customer using contact information included in his request link 4 and determines the arriving customer ID 9. The arriving customer ID is used to read his customer resource usage parameter 11 from the database 15 along with the ensemble customer resource usage statistics 13. The ensemble customer resource usage statistics are used to determine the queue 17 spans 18 establishing which one of the plurality of queues encompasses the arriving customer resource usage parameter, and the arriving customer is sorted into that queue in, preferably, a FIFO manner. The spans are established based on the most recent ensemble customer resource usage statistics to adapt to change in the ensemble usage. Other than having non-overlapping spans, the number of queues and their spans are arbitrary and selectable for the application.

Examples of the customer resource usage parameter 11 and of the ensemble customer resource usage statistics 13 are included below.

Stochastic Queue Sequencer: The Stochastic Queue Sequencer 7 is responsive to the busy indication 19 from resource 21 and, when busy is negative and the queues 17 are not all empty, accesses the ensemble customer resource usage statistics 13 from database 15, and generates a stochastic random number 60 having statistical description drawn from the ensemble customer resource usage statistics. This random number falls within one of the queue spans 18, and a waiting customer within that queue is extracted (sequenced) and passed to the resource. Customer extraction from the queue is, preferably, in a FIFO manner.

The Stochastic Queue Sequencer 7 signals the database 15 that the sequenced customer 10, indicated by the sequenced customer ID 14, is using the resource 21 by application of the resource access initiation 23 signal. When the sequenced customer releases the resource, the resource access cessation 25 signal is applied.

The generation of the random number 60 is discussed below.

Database: The database 15 comprises a read/write memory device for maintaining the raw usage information 62. The raw usage information consists of, preferably, the resource usage samples of all customers within the ensemble of customers. Further, when the raw usage information is updated in response to the resource access initiation 21 and resource access cessation 25 signals, the database recalculates the ensemble customer resource usage statistics 13 and customer resource usage parameters 11.

Adaptive feedback: As the customer ends his resource access, the duration of his access is logged into the database 15 raw usage information 62 to update the database 15 raw usage information 62 and adapt to changing customer resource use by adjusting the customer resource usage parameters 11, the ensemble customer resource usage statistics 13, and the queues 17 spans 18.

Reporting position-in-queue: As it is helpful, and occasionally comforting, to notify the customer of his position in the queue, the preferred embodiment is here enhanced for this purpose. As described previously, since the customer sequencing process is inherently random, Adaptive Stochastic Queueing 1 does not define the customer sequence position, exactly, even up to the point he is passed to resource 21. However, those skilled in the art are capable of using the statistical nature of the Stochastic Queue Sequencer 7 to calculate a probable sequence position for approximate notification.

Figure 3:
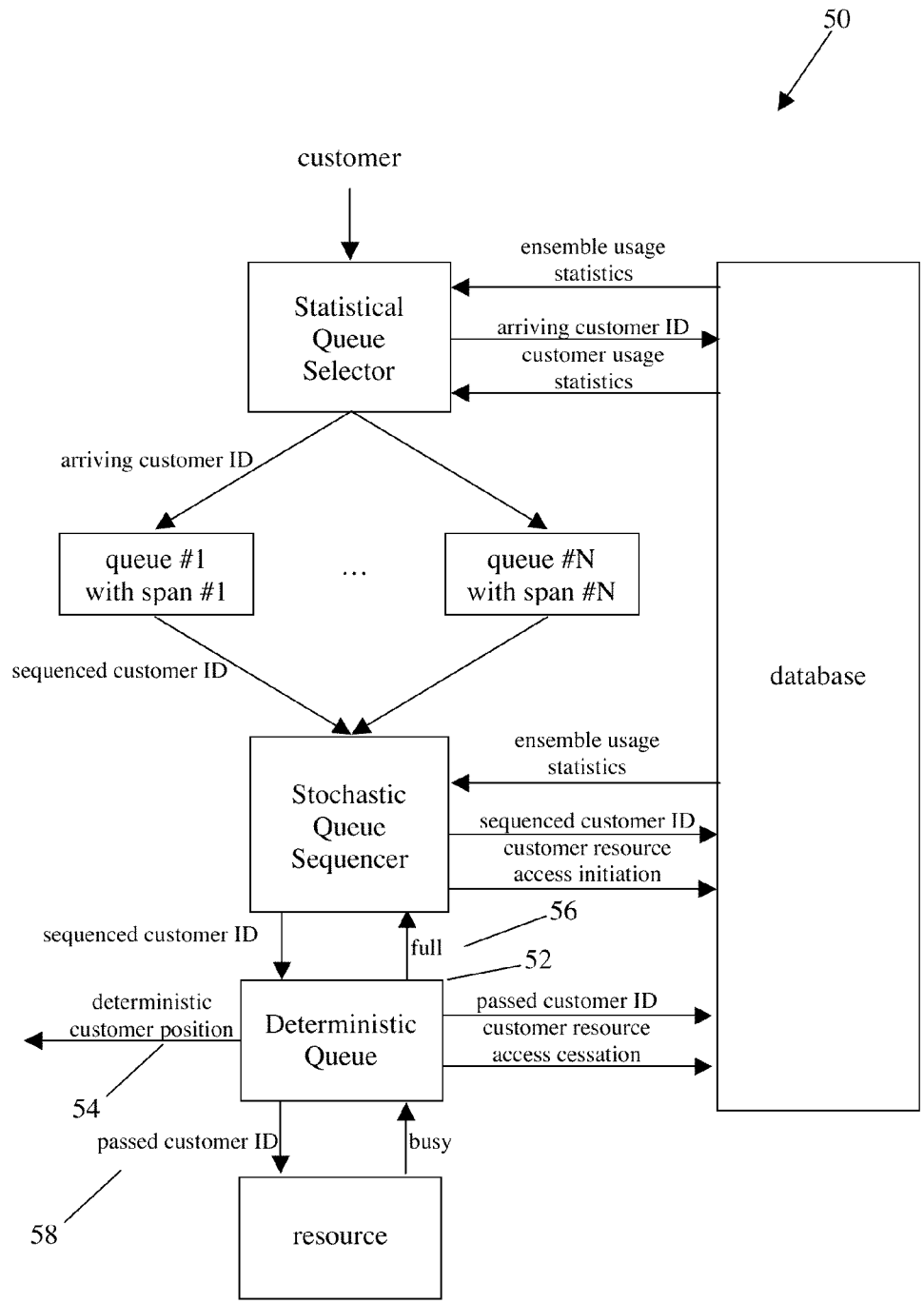
FIG. 3 is a block diagram of an embodiment of Adaptive Stochastic Queueing having a means to report a deterministic customer position within the queue.

For exact notification, as illustrated in FIG. 3, a deterministic sequence position is provided by a further embodiment 50 including the Deterministic Queue 52 where, once the customer is entered into it, his position is no longer random. In operation, the Stochastic Queue Sequencer 7 responds to the full indication 56 from the Deterministic Queue and, when the full indication is negative, as previously described, the Stochastic Queue Sequencer 7 sequences a customer 10 from a queue 17 and passes him to the Deterministic Queue.

The Deterministic Queue 52 is, preferably, a FIFO device and responds to the busy 19 indication from resource 21. When busy is negative, the Deterministic Queue extracts its next waiting customer and passes him to the resource. The Deterministic Queue further produces the customer deterministic position 54 within itself for communication to the customer, and updates the database 15 with the passed customer resource access cessation information 25 using the passed customer ID 58.

An example having two queues: The following example is included to illustrate the principals of Adaptive Stochastic Queueing 1 and to describe a simple implementation. The data manipulations are statistical in nature and, beyond this example, there are other statistical manipulations that would also apply and are here considered.

Consider a time limited resource (e.g. a live attendant responding to requests) where the daily time duration a customer accesses the attendant resource is used as the resource usage measure. Clearly other measures would be applicable, but here we use this simple measure as an illustration. The durations for each customer are logged into a database 15 as raw usage information 62.

FIG. 4A displays, for each of 500 customers, the simulated daily resource usage over the past 30 days and is the raw usage information 62 for this example. For insight into the usage data, FIG. 4B is a histogram of the usage data of FIG. 4A; FIG. 4C is the probability density distribution of the histogram calculated by dividing each point of FIG. 4B by the integral of FIG. 4B so that the integral of the density is unity; and FIG. 4D is the cumulative distribution calculated as the integral of the FIG. 4C density distribution.

The raw usage information 62 (FIG. 4A), consisting of 30 values per customer (one per day of the 30 day window), is consolidated to a single value per customer by averaging over the days when he has used the resource, and results in the data shown in FIG. 5A representing the mean daily usage by all customers over the 30 day window. The entries of this customer-indexed list of daily averages provide the customer resource usage parameter 11 for each customer in the ensemble, and is recalculated from the updated raw usage information 62 whenever the raw usage information is updated. FIG. 5B is the histogram of FIG. 5A, and FIG. 5C is the probability density of FIG. 5B. FIG. 5D is the cumulative distribution taken from FIG. 5C indicating that 90% of the time customers are using less than 8.7 avg. minutes/day. This FIG. 5D cumulative distribution curve is used as the ensemble customer resource usage statistics 13 for this example.

Defining customers that lie beyond the 90% point of the ensemble customer resource usage statistics 13 as Excessive users, and those that lie on or below the 90% point as Normal, two FIFO queues 17 are established, one Normal and one Excessive. According to the ensemble customer resource usage statistics (FIG. 5D), Normal span 18 encompasses the mean daily use values from zero to 8.7 avg. minutes/day, and the Excessive span encompasses the values greater then 8.7 avg. minutes/day. The 8.7 avg. minutes/day 90% value is determined by interpolating the ensemble customer resource usage statistics to 90%.

The queues are filled in real time as customers arrive by identifying the customer, accessing his customer resource usage parameter 11, and sorting him into one of the two queues as per their spans. FIG. 6A depicts the Excessive customers of FIG. 4A with circles.

When the resource is available and the Normal queue is empty, the next FIFO customer in the Excessive queue is extracted and passed to the resource. If the Excessive queue is empty, the next FIFO customer in the Normal queue is given access.

If both queues are populated, access is given randomly according to the cumulative probability density of the ensemble customer resource usage statistics 13. A random number 60 is generated reflecting the cumulative probability density curve of the ensemble customer resource usage statistics and, if the number is greater than 8.7 avg. minutes (10% probability) the next FIFO customer in the Excessive queue is given access to the resource. Otherwise, the next FIFO customer in the Normal queue (90% probability) is given access.

To simplify the simulation logic, assume all customers are acquired and queued at one time. FIG. 6B illustrates the simulated order with which the customers requested access where lines connect sequential requests. FIG. 6C illustrates the selection again by presenting them in order sequenced by the Adaptive Stochastic Queueing 1. The Excessive Queue is processed throughout the sequencing procedure and, toward the end, the sequencing focuses on the Excessive queue since the Normal queue has been emptied.

As each customer ends his use of the attendant, his time usage is logged into the database 15 raw usage information 62 to adapt to changing resource usage by altering the customer resource usage parameters 11, the ensemble customer resource usage statistics 13, and the queues 17 spans 18.

In this example, the mean value is used to form customer resource usage parameter 11 and the ensemble customer resource usage statistics 13 on which the sequencing of the queued customers is based. Other evaluations can be made, such as the mean plus one standard deviation in order to capture the variability beyond the mean, and other measures are apparent to those skilled in the art.

Further, several more queues 17 could have been used to smooth the transition from Normal to Excessive (e.g. Light from 0-40%, Heavy from greater than 40% to 80%, and Excessive from greater than 80% to 100%).

For some applications it may be desired to reverse the logic such that customers that use the resource lightly are less desired than those that use it heavily. For example, from FIG. 4D, choose a Light bin from zero to 6.6 minutes/day to capture the lowest 10%, and the Heavy bin above that to capture the 90% heavy users. Considerations such as this are application specific and known to those skilled in the art.

Generating the random number 60: When the ensemble customer resource usage statistics 13 are represented by a cumulative distribution curve, as in the example, the random number generation procedure is the known Inverse Transform Sampling:

Generate a random number, u, from the standard uniform distribution in the interval [0,1] using any number of common algorithms, where [0,1] is the y-axis range of the cumulative distribution;

Using u as the y-axis coordinate, interpolate the cumulative probability to find x, the x-axis coordinate having cumulative distribution equal to u; and use x as the random number 60 having the given cumulative distribution.

If the ensemble customer resource usage statistics is not represented by a cumulative probability curve, other means are known to those skilled in the art.

Figure 7:
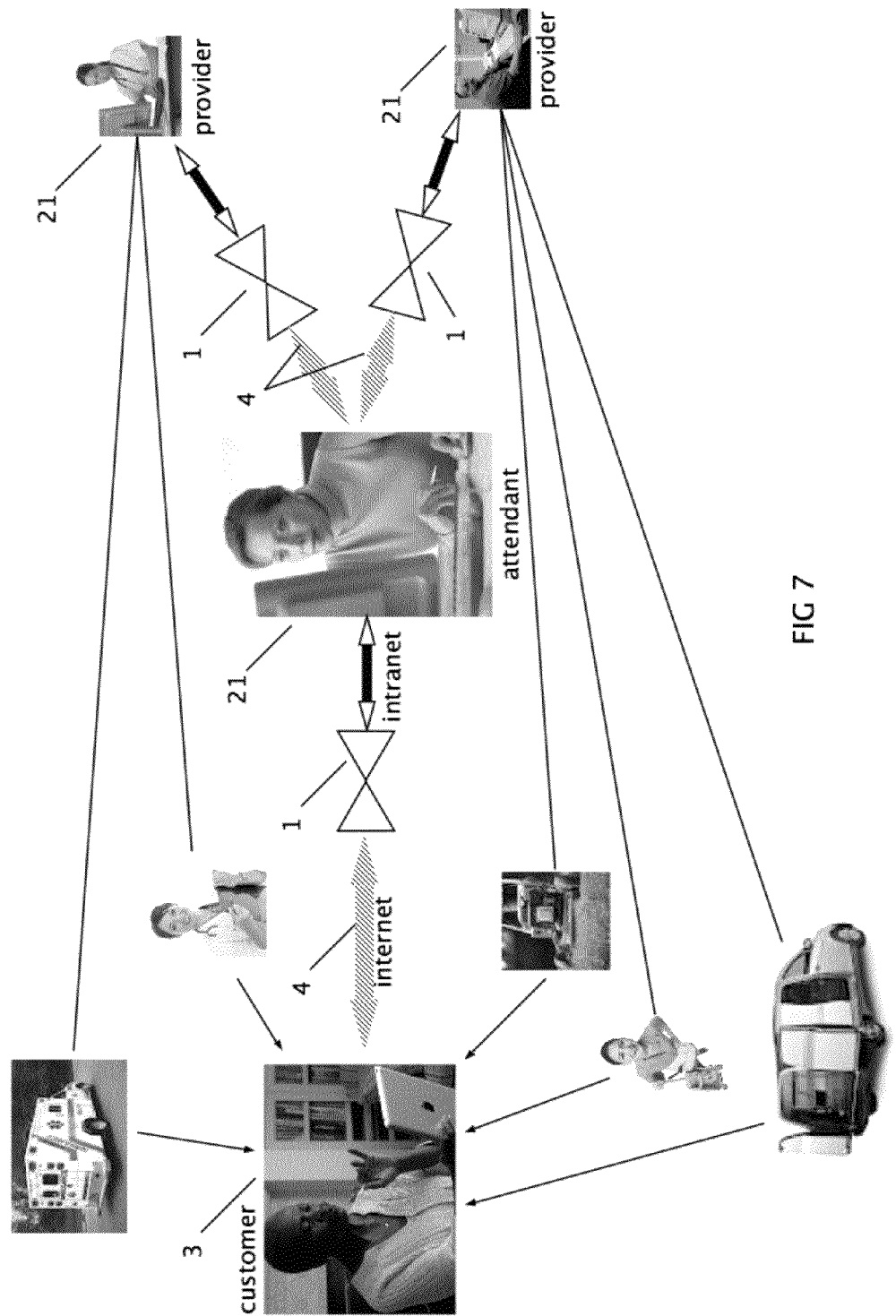
FIG. 7 is an example of the application of Adaptive Stochastic Queueing to a real-world at-home resident support system.

An example application: FIG. 7 continues the at-home resident support system discussed previously and illustrates the application of Adaptive Stochastic Queueing 1 in a real-world situation. An arriving customer 3 uses a tablet computer or other device to connect to a remote attendant over the Internet. An Adaptive Stochastic Queueing device sequences the waiting customers according to the attendant availability. When the attendant has dealt with a customer, and should the customer and others waiting need further assistance from providers having specific skill sets, the customers are queued and sequenced to them through other Adaptive Stochastic Queueing devices.

The providers care for the customer by arranging various services, and the customer's needs are satisfied in a timely manner while minimizing the requisite number of attendants and providers should chronically needy customers be queued with them.

The intranet links connect the associated Adaptive Stochastic Queueing 1 devices to multiple attendants or providers to handle simultaneous customers 3 and multiple resources 21. Each of the Adaptive Stochastic Queueing devices, transparent to the customer, attendants and providers, may share a database 15 customer history, or maintain their own histories should they be unique.

In a similar manner, customers may request access to more automated features that are limited. For example, chat rooms or exercise classes with limited member slots, or other bandwidth limited functions like video on demand. These limited features can also be distributed using Adaptive Stochastic Queueing.

Other Embodiments

While several illustrative embodiments of the invention have been shown and described, numerous variations and alternate embodiments will occur to those skilled in the art. For example:
- using the newly provided database information once per day, once per month, . . . rather than immediately to define the queues;
- if the customer contract can be altered by, for example the purchase of more time, then FIG. 4A accommodates this by showing the time used per day divided by the time purchased for all customers, and other scale factors are used for other measurements (e.g. cost);
- considerations other than resource usage duration are included (e.g. time of day when the resource is requested, product purchased, . . . );
- applications include computer thread queuing and many other queueing needs.
- queues may be other then FIFO (e.g. random selection).

Such variations and alternate embodiments, as well as others, are contemplated and can be made without departing from the spirit and scope of the invention as defined in the appended claims.

What is claimed is:

1. A device to queue a plurality of customers requesting access to a resource where said customers belong to an ensemble of customers, where the history of resource usage is known for each customer, and where the device comprises: a plurality of queues with each assigned a span defining the customers to be queued within it; a database retaining the history of resource usage for each customer; a statistical queue selector that: reduces the history of resource usage for each customer to a customer resource usage parameter value and collects the ensemble resource usage parameter values into an ensemble resource usage probability distribution; calculates and assigns said spans of said plurality of queues in response to the ensemble resource use probability distribution; and sorts each arriving customer into one of said queues in response to the queue spans and the customer resource usage parameter value; a stochastic queue sequencer that: generates a random number in response to said ensemble resource usage probability distribution; selects the queue having span encompassing the random number; selects a customer therein queued and provides said customer with resource access; and updates the resource usage by the selected customer where said plurality of arriving customers are stochastically queued and sequenced according to their historical usage within the context of the ensemble customer history of resource usage and in a manner that adapts to customer resource usage.

2. The device of claim 1 where the customer resource usage parameter value is the average of the history of resource usage by said customer over a defined period.

3. The device of claim 1 where the ensemble resource usage probability distribution is the cumulative distribution.

4. The device of claim 3 where said random number is selected from said cumulative distribution using Inverse Transform Sampling.

5. The device of claim 1 where said queues are FIFO.

6. The device of claim 1 where said customers are human.

7. The device of claim 1 where providing said customer with resource access includes routing said selected customer to a deterministic queue from which customers are routed to the resource in a non- random manner while deterministic customer sequence information is provided in response to the deterministic queue.

8. The device of claim 1 is applied within an at-home resident support system.

9. A method to queue a plurality of customers requesting access to a resource where said customers belong to an ensemble of customers, where the history of resource usage is known for each customer, and comprising the steps: providing a plurality of queues with each assigned a span defining the customers to be queued within it; providing a database retaining the history of resource usage for each customer; providing a statistical queue selector that: reduces the history of resource usage for each customer to a customer resource usage parameter value and collects the ensemble resource usage parameter values into an ensemble resource usage probability distribution; calculates and assigns said spans of said plurality of queues in response to the ensemble resource use probability distribution; and sorts each arriving customer into one of said queues in response to the queue spans and the customer resource usage parameter value; providing a stochastic queue sequencer that: generates a random number in response to said ensemble resource usage probability distribution; selects the queue having span encompassing the random number; selects a customer therein queued and provides said customer with resource access; and updates the resource usage by the selected customer where said plurality of arriving customers are stochastically queued and sequenced according to their historical usage within the context of the ensemble customer history of resource usage and in a manner that adapts to customer resource usage.

10. The method of claim 9 where the customer resource usage parameter value is the average of the history of resource usage by said customer over a defined period.

11. The method of claim 9 where the ensemble resource usage probability distribution is the cumulative distribution.

12. The method of claim 11 where said random number is selected from said cumulative distribution using Inverse Transform Sampling.

13. The method of claim 9 where said queues are FIFO.

14. The method of claim 9 where said customers are human.

15. The method of claim 9 where providing said customer with resource access includes the step routing said selected customer to a deterministic queue from which customers are routed to the resource in a non-random manner while deterministic customer sequence information is provided in response to the deterministic queue.

* * * * *